United States Patent [19]

Sibley et al.

[11] 4,126,587

[45] * Nov. 21, 1978

[54] CLEANING AGENTS FOR CONTACT LENSES

[75] Inventors: Murray J. Sibley, Berkeley; Gordon H. K. Yung, Sunnyvale; Petronio D. Urrea, Pleasanton, all of Calif.

[73] Assignee: Barnes-Hind Pharmaceuticals, Inc., Sunnyvale, Calif.

[*] Notice: The portion of the term of this patent subsequent to Sep. 13, 1994, has been disclaimed.

[21] Appl. No.: 781,598

[22] Filed: Mar. 28, 1977

Related U.S. Application Data

[63] Continuation of Ser. No. 651,744, Jan. 23, 1976, Pat. No. 4,048,122.

[51] Int. Cl.$^2$ .......................... C11D 1/38; C11D 3/20; C11D 3/26; C11D 3/37
[52] U.S. Cl. ...................................... 252/541; 134/40; 134/42; 252/544; 252/548; 424/326
[58] Field of Search ............... 252/541, 548, 544, 117; 134/40, 42; 260/825; 424/326

[56] References Cited

U.S. PATENT DOCUMENTS

| 2,586,496 | 2/1952 | Young et al. | 252/117 |
| 2,834,748 | 5/1958 | Bailey et al. | 260/825 |
| 3,689,673 | 9/1972 | Phares | 424/326 |

Primary Examiner—Thomas J. Herbert, Jr.
Attorney, Agent, or Firm—Townsend and Townsend

[57] ABSTRACT

Method and compositions are provided for the effective cleaning of soft and silicone contact lenses by soaking the lenses for a time sufficient to remove adherent residues in a solution containing an epoxy modified silicone surfactant and a fatty acid amide (or nitrogen analog thereof) surfactant, which may be cationic or non-ionic. Other additives may also be included such as thickening agents, bactericides, salts, anionic surfactants, and the like. The compositions are found to be particularly effective in removing strongly adhering proteinaceous matter, as well as lipids and polysaccharides.

By employing a particular combination of surfactants, soft contact lenses can be freed of impurities and adhering matter introduced during manufacture of the lens, while the lens is being hydrated. The lens is soaked under moderate conditions in an aqueous saline bath with a combination of a zwitterion surfactant and a fatty acid amide surfactant.

7 Claims, No Drawings

4,126,587

CLEANING AGENTS FOR CONTACT LENSES

CROSS-REFERENCE TO RELATED APPLICATIONS

This is a continuation of application Ser. No. 651,744 filed Jan. 23, 1976, now U.S. Pat. No. 4,048,122.

BACKGROUND OF THE INVENTION

1. Field of the Invention

Because of the polar nature of contact lenses, particularly soft contact lenses, and the environment in which soft contact lenses are handled and employed, a wide variety of materials adhere to the lenses during daily usage. During usage in the eye, the lenses are subjected to proteinaceous matter: particularly enzymes such as lysozyme; mucoproteins; and lipids, such as sterols, waxes, glycerides, phospholipids, fatty alcohols and acids. In addition to these naturally occurring materials, cosmetics, grease from the hands and dust and other materials in the air can all act together to form a strongly adhering coating to the lenses.

Soft lenses are highly porous and because of their fragile character cannot be mechanically scrubbed. In addition, the soft contact lens acts as a host for bacteria and other disease causing organisms. Many of the common bactericides are adsorbed by the soft contact lens and act as an irritant in the eye, despite careful washing of the lens after treatment with the bactericide. Therefore, one sterilization treatment involves the use of steam. The high temperature has the effect of hardening the foreign coating on the lens, particularly by denaturing proteins which may be absorbed on the lens. An accumulation of a coating can result in distortion of the lens and reduction of light transmitted through the lens.

It is therefore desirable to find a simple and efficient way to ensure the removal of strongly adhering foreign matter from soft contact lenses, as well as other contact lenses. The method should be effective over a relatively short period of time, certainly not longer than overnight, and should be safe to the user and provide a clean lens which may be readily rinsed and then be safe to be introduced into the eye.

During manufacturing of soft lenses, a blank is initially employed which is shaped to the desired prescription. During the machining of the lens, the lens accumulates various deposits, particularly oils and greases from the tools and handling. The industry has required a quick and efficient way for removing the deposits.

2. Description of the Prior Art

U.S. Pat. No. 3,689,673 teaches the use of chlorhexidene as a bactericide for sterilizing hydrophilic soft contact lenses.

SUMMARY OF THE INVENTION

Method and compositions are provided for the effective removal of strongly adhering soilants to contact lenses, particularly soft contact lenses and silicone contact lenses by soaking the lenses in a cleansing solution.

For repetitive use by the contact lens wearer, a cleaning solution is used comprising a polyalkyleneoxy modified silicone resin and a fatty acid amide (or nitrogen analog thereof) of an amine which is at least disubstituted. Other additives may be present, such as cationic surfactants, thickening agents, salt, bactericides, and the like. The solution is particularly effective when employed as an ancillary material to be used in a regimen which includes a daily cleaner and the subject cleaner at less frequent intervals.

For cleaning the lens after machining, the cleansing solution employs a combination of surfactants derived from fatty acid amides.

DESCRIPTION OF THE SPECIFIC EMBODIMENTS

Compositions are provided for use in a cleaning method for cleaning soft and silicone contact lenses from strongly adhering and tenacious soilants. The composition employed in the method uses a water soluble polyalkyleneoxy modified dimethyl-silicone resin, the polyoxyalkylene group having alkylene groups of from 2 to 3 carbon atoms, there being two carbon atoms between oxygen atoms, and a fatty acid amide, the fatty acid being of from about 10 to 14 carbon atoms with an amine which is at least disubstituted with aliphatic groups, two groups having oxygen containing substituents. The method is carried out by introducing the contact lens into the solution at ambient conditions for a time sufficient to remove the strongly adhering soilants. Normally, at least about 0.5 hour will be employed, and usually not more than 24 hours, more usually not more than about 12 hours.

The contact lenses with which the subject cleansing solution finds use are primarily soft lenses and silicone lenses. Soft lenses are normally comprised of a cross-linked polymer of hydroxyethyl methacrylate either homopolymerized or co-polymerized with vinyl pyrrolidone, either as a random or block co-polymer. The silicone lenses are derived from dimethyl polysiloxane, usually modified by substituting the methyl groups with another group e.g. phenyl. While the subject invention finds particular use with the soft lenses and silicone lenses, the cleanser may also be used with hard lenses which are normally prepared from polymethyl methacrylate or cellulose acetate-butyrate.

In describing the subject invention, the individual additives will be considered first, followed by a description of the final composition.

Cleansing Solution Components

Polyalkyleneoxy Modified Silicone

The polyalkyleneoxy modified silicone is a water soluble silicone modified with polyalkyleneoxy groups wherein the alkylene is of from 2 to 3 carbon atoms. Illustrative compositions are described in U.S. Pat. Nos. 2,834,748 and 3,505,377. The compositions employed in this invention have a viscosity at 25° C. of from about 900–1600, more usually from about 1000–1500 cs. The specific gravity at 25/25° C. will normally be about 1.03, while the surface tension at 25° C. will be about 20–22, more usually about 21 dynes per cm. The surface tension at a concentration of 1% in water at 25° C. will generally be from about 25–28, more usually from about 26–27 dynes per cm.

At a concentration of 1 weight percent in water, the cloud point will be below 50° C., usually below about 40° C. and will usually be above about 30° C. The silicone polymer will usually be a block copolymer with the polyalkyleneoxy polymer.

The silicone polyalkyleneoxy copolymers are preferably block copolymers, that is there is an extended chain of siloxyl groups joined to an extended chain of a polyalkyleneoxy polymer. The copolymer may be a single chain or a branched chain, particularly where the chains emanate from an alkylsilyl group, where the alkyl group is of from 1 to 3 carbon atoms, there usually being only one alkyl group.

The siloxy units will be dimethylsiloxy units while the alkyleneoxy units will be ethyleneoxy or 1,2-propyleneoxy units. The number ratio of ethyleneoxy units to other units (dimethylsiloxy and propyleneoxy) will be at least 0.5:1 and generally not more than about 5:1, usually not more than about 2:1. The molecular weight of the copolymer will generally be from about 4,000 to 10,000, preferably about 5,000 to 7,500.

The terminal groups of the polymer will usually be an alkylsiloxy group at one end and an alkoxy group of from 1 to 6 carbon atoms at the other end.

The preferred siloxane-polyoxyalkylene copolymers employed in this invention will have the following formula $$TSi(O(SiMe_2O)_x(C_nH_{2n}O)_yT')_3$$

wherein:
each of the chains may be the same or different, the values given for $x$ and $y$ being the average over the entire composition
$x$ is a number in the range of 3 to 10, usually 4 to 8;
$y$ is a number in the range of 20 to 50, usually 25 to 40;
$n$ is an integer of from 2 to 3;
T is alkyl of from 1 to 3 carbon atoms, usually methyl and
T' is alkyl of from 1 to 6 carbon atoms, usually 3 to 4 carbon atoms.

More preferably the siloxane-polyoxyalkylene block copolymer will have the following formula:

$$TSi(O(SiMe_2O)_{x^1}(C_2H_4O)_a(C_3H_6O)_bT')_3$$

wherein:
each of the chains may be the same or different, the values given for $x^1$, $a$ and $b$ being the average over the entire composition;
$x^1$ is a number in the range of 4 to 8, usually 5 to 7;
$a$ is a number in the range of 15 to 30, usually 15 to 25;
$b$ is a number in the range of 10 to 20, usually 12 to 16; and
the other symbols have been defined previously.

Fatty Acid Amide

The fatty acid amide or nitrogen analog thereof is of an amine which is at least disubstituted by from 2 to 3 aliphatic groups, two of the groups having oxygen containing substituents as oxy or carbonyl, particularly non-oxo carbonyl. For the most part, the fatty acid amides which are employed in the subject invention will have the following formula

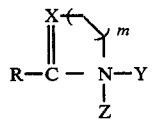

wherein:
R is an aliphatic group having a total unsaturation of from 0 to 1 site of olefinic unsaturation, usually saturated, of from 9 to 13, usually 11 carbon atoms;
X is oxygen or nitrogen;
$m$ is 0 when X is oxygen and 1 when X is nitrogen, wherein the nitrogen to which Y and Z is attached is positive;
Y is an aliphatically saturated group of from 2 to 4 carbon atoms and from 1 to 3 oxygen atoms as the only heteroatoms, the oxygen atoms being present as oxy (hydroxy or ether), there being at least two carbon atoms between heteroatoms, or as non-oxo-carbonyl, with the proviso that when oxygen is present as non-oxo-carbonyl (carboxy), the non-oxo carbonyl group may be present as the acid or its physiological acceptable salt e.g. sodium; and
Z is a saturated aliphatic group of two to three, usually two carbon atoms and from 1 to 2 oxygen atoms as the only heteroatoms, which may be present as oxy or non-oxo-carbonyl and the non-oxo-carbonyl group may be present as the acid or a physiological acceptable salt e.g. internal (zwitterion) or sodium.

When the fatty acid amide is of the formula when $m$ is 0, it will for the most part have the formula:

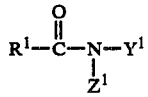

wherein:
$R^1$ comes within the definition of R
$Y^1$ and $Z^1$ are the same or different and are hydroxyalkyl of from 2 to 3 carbon atoms, the oxygen and nitrogen being separated by at least 2 carbon atoms.

When the fatty acid amide is of the formula when $m$ is 1, it will for the most part have the following formula:

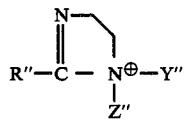

wherein:
R" comes within the definition of R;
Y" is an aliphatically saturated carboxylic acid group of from 2 to 4 carbon atoms having from 0 to b 1 ethereal oxygen and free of other heterofunctionalities;
Z" is an aliphatically saturated carboxylic acid group of from 2 to 3 carbon atoms, and free of other heterofunctionalities;
wherein the acids and quaternary ammonium groups have physiologically acceptable counterions e.g. zwitterion, proton, alkali metal cation e.g. sodium, etc.

The imidazoline compounds may be prepared in accordance with the teaching of U.S. Pat. No. 2,586,496.

Of particular interest is the lauramide of diethanolamine and 2-undecyl-3-carboxymethyl-3-(2'-(carboxymethoxy)ethyl)-1-imidazoline, usually as the disodio hydroxy salt.

Particularly, in combination with the diethanolamine amide or homolog, small amounts of organic salts of diethanolamine or its homologs may be used, particularly salts of fatty acids of from 16 to 18 carbon atoms having from 0 to 1 site of ethylenic unsaturation e.g. oleate salts or alkylbenzenesulphonate salts, wherein the alkyl group is straight or branched chain, and is normally of from 6 to 18, more usually from 8 to 14 carbon atoms. When present, the salts will generally be used in a mole ratio of salt to amide in the range of 1:2–4 more usually 1:3. That is, from about 20 to 33, usually 25 mole %, of the amide is replaced with the salt.

Miscellaneous Additives

In addition to the essential active ingredients, other additives will also be included for fulfilling specific functions. For example, a quaternary sterilizing or bactericidal additive will be included, particularly cetyltrimethyl ammonium bromide to be used with other than the soft contact lenses and not in combination with an anionic surfactant. To provide a high viscosity, various cellulosic additives may be included, such as carboxymethylcellulose, hydroxypropylcellulose, and the like. The cellulosic thickening agent will generally be modified with an aliphatic group of 2 to 3 carbon atoms and 1 to 2 oxygen atoms as oxy and non-oxo-carbonyl. The viscosity of the solution should be from about 2 to 20cs at 25° C. The thickners aid in preventing redeposition of soilants.

In addition the solution is preferably isotonic, which can be readily achieved with sodium chloride. The solution is isotonic with the solution employed in the production of the soft contact lenses.

Small amounts of other materials may also be included, particularly antimicrobials, such as Thimerosal and methyl- or propylparaben.

Cleansing Compositions

The cleansing composition for repetitive use will normally be used in the form provided, rather than as a concentrate to be diluted by the ultimate user. However, it should be understood, that concentrates may be prepared having from 2 to 10, more usually from 2 to 5 times the various ingredients in an aqueous medium.

The first component is the modified silicone which is normally present in at least 0.5 weight percent and not more than 2 weight percent, more usually in the range from about 0.75 to 1.5 weight percent, and preferably 1 weight percent.

The fatty acid amides which are employed will be present in total amount of at least about 0.25 weight percent and not more than about 2.5 weight percent, more usually being in the range from about 0.5 to 2 weight percent. The neutral amide surfactant will normally be present in from about 0.05 to 1 weight percent, more usually from about 0.75 to about 0.5 weight percent. The cationic amide surfactant will normally be present in from about 0.25 to 1.5 weight percent, more usually in from about 0.5 to 1 weight percent.

The fatty acid salt, when present, will generally be present in amounts ranging from about 0.02 weight percent to about 0.75 weight percent.

The cellulosic thickening agent will be present in an amount to provide the desired viscosity, generally being present in from about 0.1 to 0.5 weight percent, usually about 0.2 to 0.3 weight percent.

The quaternary bactericide when present, will be in an amount from about 0.5 to 2.5 percent, more usually from about 0.75 to 1.5 weight percent, and preferably about 1 weight percent.

Thimerosal may generally be present in from about 0.001 to 0.004 weight percent, while the parabens, either individually or together, will generally be present in total amount in from about 0.05 to about 0.2 weight percent.

The pH of the solution will generally be from about 7 to 9, preferably 8, and the pH may be adjusted to the desired pH with hydrochloric acid or other physiologically acceptable acid.

When cleansing the machined lens, the cleaning solution will be a combination of fatty acid amides (including the nitrogen analog) of the following formula, when one of the amides will have $m$ as 0, and the other will have $m$ as 1:

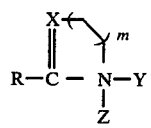

wherein all of the symbols have been defined previously. Preferably an organic salt of diethanolamine will be included with the amide where $m$ is 0. This salt has been previously described.

The weight ratio of the two amides will generally be from about 0.5–2:1. Preferably from about 25 to 35 weight % of the amide, $m = 0$, will be replaced with the organic salt.

The weight % of each of the two amides will generally be in the range of 2 to 10 weight %, usually 3 to 8 weight % and preferably about 5 weight %. The total amount of amide will usually be about 5 to 15 weight %.

A cellulosic thickening agent as previously described will also be included to provide the desired viscosity. The weight % of the cellulosic thickening agent will come within the same ranges as indicated for the surfactants.

Finally, the solution will usually be isotonic saline.

For convenience, the solution can be used as described or be diluted 10 to 20 fold.

Cleansing of Contact Lenses

The repetitive cleansing solution of the subject invention is preferentially employed as an adjunct to a daily cleaning regimen, being employed to remove deposits which are not satisfactorily removed by the daily regimen or, where the daily regimen is not regularly adhered to, removing deposits which may accumulate. With soft contact lenses, the problem of accumulated deposits or soilants may become particularly severe, because of the sterilizing techniques, which include steam treatment. The steam causes denaturation of protein, which results in a hard tenaciously adhering coating.

Where only a small amount of soilant is present, which has not become strongly adherent to the lenses, the lenses may be cleansed by mild rubbing of the subject solution on the lens surface, followed by rinsing. However, in most instances, it will be desirable to soak the lenses in the cleansing solution for a time sufficient to remove the adherent soilants. Usually at least 0.5 hours will be employed, and rarely more than 24 hours, more usually from about 0.5 to 6 hours, although an over-night soaking is usually the most convenient.

Conveniently, from about 3 to 5ml may be added to an appropriate vessel and the lenses allowed to soak in the solution for the desired period of time. At the end of this time, the lenses are removed, rubbed, rinsed thoroughly, disinfected and are ready to wear.

Two formulations were prepared of the active ingredients of the subject invention. The first composition had 1 percent of a modified silicone surfactant, having the following average formula:

MeSi[(OSiMe$_2$)$_{6.4}$(OC$_2$H$_4$)$_{19}$(OC$_3$H$_6$)$_{14}$OButyl]$_3$.

The composition in a siloxane-polyoxyalkylene block copolymer having a viscosity at 25° C. of 1100cs, a surface tension at 25° C. of 21 dynes per cm and a surface tension of 1 percent in water at 25° C. of 26 dynes per cm. The cloud point at 1% in water is 38° C. In addition to the above silicone composition 0.1 weight percent of a 3:1 weight ratio mixture of N,N-di(2-hydroxyethyl) lauramide and the oleate salt of diethanolamine; and 0.5 weight percent of 2-undecyl-3-(2'-carboxymethoxyethyl)-3-carboxymethyl-1-imidazoline disodio salt hydroxide. In a second solution, the same amount of the silicone was employed with 0.5 weight percent of the lauramide-salt combination and 1 weight percent of the pyrroline. The solutions were found to be extremely effective in the removal of strongly adherent residues which had accumulated on soft contact lenses and silicone contact lenses.

In a particular embodiment, a solution was prepared of 1 weight percent of the above indicated siloxane, one weight percent of the imidazoline, one weight percent of cetyltrimethyl ammonium bromide, 0.25 weight percent of hydroxypropylcellulose, and 0.9 weight percent of sodium chloride to provide isotonicity and the solution adjusted to pH 8 with hydrochloric acid. The solution was found to be extremely effective in cleansing contact lenses on soaking for short periods of time, had a long shelf life, and the lenses were readily rinsed of the solution to be worn by the contact lens wearer.

For cleansing and hydrating machined lens blanks, the lens is introduced into a solution at an elevated temperature, generally exceeding 45° C., usually in the range of 35° to 75° C. and preferably about 65° C. The time for the soaking will usually be at least 0.5 hr. and not exceeding 12 hours, usually from about 1 to 10 hours, whereby full hydration is achieved and the lens is freed of adventitious impurities and adhering matter. The lens may then be removed and rinsed.

An isotonic saline solution was prepared containing 0.5 weight % of the above indicated lauramide-oleate mixture, 0.5 weight % of the above indicated imidazoline and 0.5 weight % of hydroxypropylcellulose. The composition was found to be extremely effective in removing impurities and adhering deposits from machined soft lens blanks while simultaneously hydrating the lenses. The temperature of the bath was about 65° C. and the soaking time was 6 hours.

It is evident from the above results that the subject cleansing compositions provide rapid and effective means for removing impurities and deposits from contact lenses. The compositions provide simple and safe methods for stripping lens surfaces of tenaciously adhering organic matter, which interferes with the use of the soft contact lenses and reduces their useful lifetime.

Although the foregoing invention has been described in some detail by way of illustration and example for purposes of clarity of understanding, it will be obvious that certain changes and modifications may be practiced within the scope of the appended claims.

What is claimed:

1. An aqueous composition useful for the removal of deposits accumulated during the manufacture of soft contact lenses which comprises:

a mixture of fatty acid amides of the formula

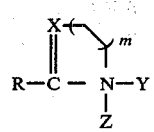

wherein one member of the mixture has $m$ equal to 0, and the other member has $m$ equal to 1, X being oxygen when $m$ is 0 and nitrogen when $m$ is 1, wherein the nitrogen to which Y and z is attached is positive;

R is an aliphatic group of from 9 to 13 carbon atoms;

Y is an aliphatically saturated group of from 2 to 4 carbon atoms and from 1 to 3 oxygen atoms, the oxygen atoms being present as oxy or non-oxo-carbonyl; and Z is a saturated aliphatic group of from 2 to 3 carbon atoms and 1 to 2 oxygen atoms as oxy or non-oxo-carbonyl, with the proviso that when $m$ is 1, at least one of Y and Z have a non-oxo carbonyl functionality, wherein the weight ratio of the two amides will be 0.5–2:1 and the concentration of each amide will be in the range of 2 to 10 weight %.

2. An aqueous composition according to claim 1, diluted from 10–20 fold.

3. An aqueous composition according to claim 1, wherein from about 20 to 33 mole % of the amide where $m$ is 0 is replaced with a diethanolamine fatty acid salt, said fatty acid being of from 16 to 18 carbon atoms.

4. An aqueous composition according to claim 3, wherein when $m$ is 0, Y and Z are 2-hydroxyethyl and when $m$ is 1, Y is carboxymethoxyethyl and Z is carboxymethyl.

5. An aqueous composition useful for the removal of deposits accumulated during the manufacture of soft contact lenses which comprises:

a mixture of N,N-di(2-hydroxyethyl) lauramide and 2-undecyl-3-(2'-carboxymethoxyethyl)-3-carboxymethyl-1-imidazoline disodio salt hydroxide in a weight ratio of 0.5–2:1 respectively and at an individual concentration in the range of about 2 to 10 weight percent.

6. An aqueous composition according to claim 5, at a dilution of from 10 to 20-fold.

7. A method for cleaning and hydrating soft contact lenses after machining soft contact lens blanks, which comprises:

immersing said lenses in a solution according to claim 1, at a temperature in the range of about 35° to 75° C. for a time of from about 0.5 to 12 hours and sufficient to hydrate said lenses and remove deposits.

* * * * *